UNITED STATES PATENT OFFICE.

DENNIS C. GATELY, OF NEWTOWN, CONNECTICUT.

IMPROVEMENT IN MANUFACTURE OF INDIA-RUBBER BELTING.

Specification forming part of Letters Patent No. 26,669, dated January 3, 1860.

*To all whom it may concern:*

Be it known that I, DENNIS C. GATELY, of Newtown, in the county of Fairfield and State of Connecticut, have invented certain new and useful improvements in the process of making machine belting or banding made wholly or in part of india-rubber or gutta-percha; and I do hereby declare that the following description forms a full and exact specification of the same, wherein I have set forth the nature and principles of my invention, by which it may be distinguished from all others of a similar class, together with such parts as I claim and desire to have secured to me by Letters Patent.

I have heretofore made improvements in the manufacture of rubber or gutta-percha belting or banding, which consists in giving a smooth friction-surface to the belt or band by various different modes—such as rolling it in sheets of flexible metal, paper, or cloth, &c.—for which I have already made application for separate Letters Patent.

The present invention consists in exposing the belt or band to or bringing it in contact with heated rolls or hollow cylinders as a preparatory step to the above-mentioned processes of imparting a smooth friction-surface to the belt or band. By thus treating the belt or band it becomes partially vulcanized, or the process of vulcanizing and the smoothing of the surface is commenced, thereby facilitating the process of afterward vulcanizing it in metal, cloth, paper, or otherwise.

The belt is made up by any proper mode previous to vulcanization and brought in contact with heated rolls or hollow cylinders by being fed through them or passed over them, or by being placed between them, or so that the rolls or cylinders shall rest upon the surface of the belt or band, or in any proper manner.

The rolls or hollow cylinders can be heated by steam or otherwise, and to any desired temperature. The result is that the belt or band commences to be cured and its smooth surface partially formed, so that the final operations of vulcanizing and smoothing the belt or band are greatly facilitated.

This process prevents also, in a great measure, the adhering of the rubber or gutta-percha to the paper, cloth, or metal which it is in contact with at the time of final vulcanization. The same process of partially heating the belt can be performed in many other methods; but the method of partially heating by rolls is the best for the object of my present invention, which is to prepare the surface of the belt in such a manner that it will finally have the most perfect and smooth friction-surface.

Having thus described my improvements, I shall state my claim as follows.

What I claim as my invention, and desire to have secured to me by Letters Patent, is—

The improvement herein described in the manufacture of machine beltings or bandings composed either wholly or in part of india-rubber or gutta-percha, which consists in partially heating the same by placing them in contact with heated rolls or hollow cylinders, or in other suitable modes, previous to their being vulcanized, substantially in the manner and for the purposes described.

DENNIS C. GATELY.

Witnesses:
ELI BARNUM,
THEO. NICHOLS.